United States Patent
Park (10) Patent No.: US 7,852,322 B2
(45) Date of Patent: Dec. 14, 2010

(54) PORTABLE COMPUTER

(75) Inventor: Young-sun Park, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 848 days.

(21) Appl. No.: 11/741,937

(22) Filed: Apr. 30, 2007

(65) Prior Publication Data

US 2008/0174560 A1 Jul. 24, 2008

(30) Foreign Application Priority Data

Jan. 24, 2007 (KR) .................. 10-2007-0007662

(51) Int. Cl.
*G06F 3/02* (2006.01)
(52) U.S. Cl. ................ 345/168; 345/163; 345/169
(58) Field of Classification Search ......... 345/156–184; 361/679.01–679.61
See application file for complete search history.

(56) References Cited

U.S. PATENT DOCUMENTS

| | | | |
|---|---|---|---|
| 6,121,529 A * | 9/2000 | Nakata et al. | |
| 6,225,976 B1 * | 5/2001 | Yates et al. | 345/156 |
| 6,512,511 B2 * | 1/2003 | Willner et al. | |
| 7,206,616 B2 * | 4/2007 | Choi | |
| 7,224,345 B2 * | 5/2007 | Kawell et al. | |
| 7,280,346 B2 * | 10/2007 | Lewis et al. | |
| 7,330,175 B2 * | 2/2008 | Miyashita et al. | |
| 2002/0118175 A1 * | 8/2002 | Liebenow et al. | |
| 2005/0078090 A1 * | 4/2005 | Glatzer et al. | |
| 2005/0248545 A1 * | 11/2005 | Nishimura et al. | |
| 2007/0279388 A1 * | 12/2007 | Pletikosa et al. | |
| 2008/0024957 A1 * | 1/2008 | Lee | |
| 2008/0174552 A1 * | 7/2008 | Bang | 345/161 |
| 2008/0174556 A1 * | 7/2008 | Jo | 345/163 |
| 2008/0174558 A1 * | 7/2008 | Lee | |
| 2008/0174560 A1 * | 7/2008 | Park | |

* cited by examiner

*Primary Examiner*—Nitin Patel
(74) *Attorney, Agent, or Firm*—Stanzione & Kim LLP (57) ABSTRACT

A portable computer includes a main body casing having an opening formed at a center part thereof, and a first panel and a second panel which are provided in opposite sides of the opening, a display part which displays an image through the opening, and a first input button group and a second input button group which are selected from a character input keyboard of a computer interface, and are respectively provided in the left panel and the right panel.

25 Claims, 4 Drawing Sheets

PORTABLE COMPUTER

CROSS-REFERENCE TO RELATED APPLICATIONS

This application claims priority under 35 U.S.C. §119(a) from Korean Patent Application No. 2007-0007662, filed on Jan. 24, 2007, in the Korean Intellectual Property Office, the disclosure of which is incorporated herein in its entirety by reference.

BACKGROUND OF THE INVENTION

1. Field of the Invention

The present general inventive concept relates to a portable computer, and more particularly, to a portable computer which improves a character input configuration.

2. Description of the Related Art

A computer provides various services, including computation and processing of data, to a user. A desk-top computer includes a personal computer which is widely used. However, the desk-top computer is hardly portable due to its size and weight. Thus, a lap-top computer which is small and light to be portable, and an ultra-mobile personal computer (UMPC) which is even smaller than the lap-top computer to be gripped by both hands, are being released in the market.

The UMPC type portable computer is not only a multimedia player, such as a portable multimedia player (PMP), but also performs general digital operations, such as web-surfing, writing documents, navigating, and games. To support such functions, the portable computer includes an input part to input characters.

The conventional portable computer includes a touch screen keyboard which is formed on an image displaying region of a display part. A user may input characters on the portable computer by pressing character buttons of a touch screen keyboard.

However, a user repeatedly presses a certain area of the display part to input characters, thereby damaging the certain area as time passes. Also, an image of the certain area may be distorted due to mechanical fatigue, or errors may occur in recognizing character inputs.

If the touch screen keyboard is formed on the display part, the keyboard covers a corresponding part of the image-displaying region of the display part, thereby interrupting a user from recognizing an image displayed thereon.

SUMMARY OF THE INVENTION

The present general inventive concept provides a portable computer which prevents damage to a display part and inputs characters without interrupting an image.

The present general inventive concept also provides a portable computer which includes a character layout with improved accessibility in consideration of a user's character input habit.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing a portable computer, comprising a main body casing having an opening formed in a center part thereof, and a first panel and a second panel which are provided at opposite sides of the opening, a display part which displays an image through the opening, and a first input button group and a second input button group which are selected from a character input keyboard of a computer interface, and are respectively provided in the left panel and the right panel.

The character input keyboard of the computer interface comprises one of a QWERTY layout, a DVORAK layout, and an AZERTY layout.

The left input button group may comprise at least one of a '~' button, a '-' button, and an '@' button.

The right input button group may comprise at least one of a shift button, a back space button, a space button, and an enter button.

The character input keyboard of the computer interface may allow the alphabet and other characters to be inputted there through, and the right input button group may further comprise an input conversion button to convert between the alphabet and the other characters.

The other characters may comprise Korean characters.

The left input button group may allow Korean consonants to be inputted and the right input button group may allow Korean vowels to be inputted.

The shift button may be spaced farthest from the opening, and may be adjacent to a circumference of the main body casing.

The shift button may be respectively provided in the left input button group and the right input button group.

The enter button may be provided in the right input button group to be spaced farthest from the opening and adjacent to the circumference of the main body casing.

The space button may be larger than other buttons included in the character input keyboard of the computer interface.

The left input button group may further comprise a numeric lock button.

The portable computer may further comprise a pointer mover which is provided in the left panel spaced from the left input button group to move a pointer displayed on the display part.

The portable computer may further comprise an auxiliary enter button which is provided in the right panel spaced from the right input button group to click the pointer.

The foregoing and/or other aspects and utilities of the present general inventive concept are achieved by providing a portable computer, comprising a main body defining an opening and having first and second panels disposed surrounding the opening, a display part disposed within the main body to display an image through the opening, and first and second input button groups respectively disposed at the first and second panels to separately interface with a main board of the portable computer to control the display part.

The portable computer may further comprise a pointer mover disposed at one of the first and second panels to control a movement of a pointer displayed on the display part, and an auxiliary button group disposed at another one of the first and second panels to control a function of the pointer.

The first and second input button groups may comprise input keys disposed among the first and second input button groups corresponding to one of a QWERTY keyboard layout, a DVORAK keyboard layout, and an AZERTY keyboard layout.

The portable computer may further comprise an input conversion button to convert a language associated with the inputs keys.

The input conversion button may convert the language of the inputs keys from western-alphabet characters to Korean characters.

The first input button group may allow Korean consonants to be inputted and the second input button group may allow Korean vowels to be inputted.

The individual keys comprising the first and second input button groups to interface with the main board may be selected according to at least one of a frequency of use, a location of use of the personal computer, and a required functionality of the personal computer.

The input keys may comprise at least one of a '~' button, a '-' button, an '@' button, a shift button, a back space button, a space button, and an enter button.

Each button of the first and second input button groups may comprise more than one input key, and the portable computer further may comprise a special function button to select among the more than one input key corresponding to each button of the first and second input button groups.

The first and second panels may be disposed opposite to each other with respect to the opening.

The main body may comprise a main board to control the display part, and the first and second panels may be connected to different sections of the main body.

The first input button group may comprise first buttons, the second input groups may comprise second buttons, and a combination of the first buttons and the second buttons may generate at least one word as the image on the display part.

The foregoing and/or other aspects and utilities of the present general inventive concept are achieved by providing a portable computer, comprising a main body having an opening, a display part to display an image through the opening, and first and second button groups separately disposed within the main body, each button group having a portion of a standard keyboard to control the image.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIGS. 1 to 4, a portable computer 1 according to the present general inventive concept may include a main body casing 100, a main board 200 which is accommodated and supported by the main body casing 100, a display part 300 which displays an image corresponding to a signal that is processed by the main board 200, a power supply 400 which supplies power to the main board 200 and the display part 300, a left input button group 500 and a right input button group 600, a pointer mover 700, and an auxiliary button 800.

Figure 1:
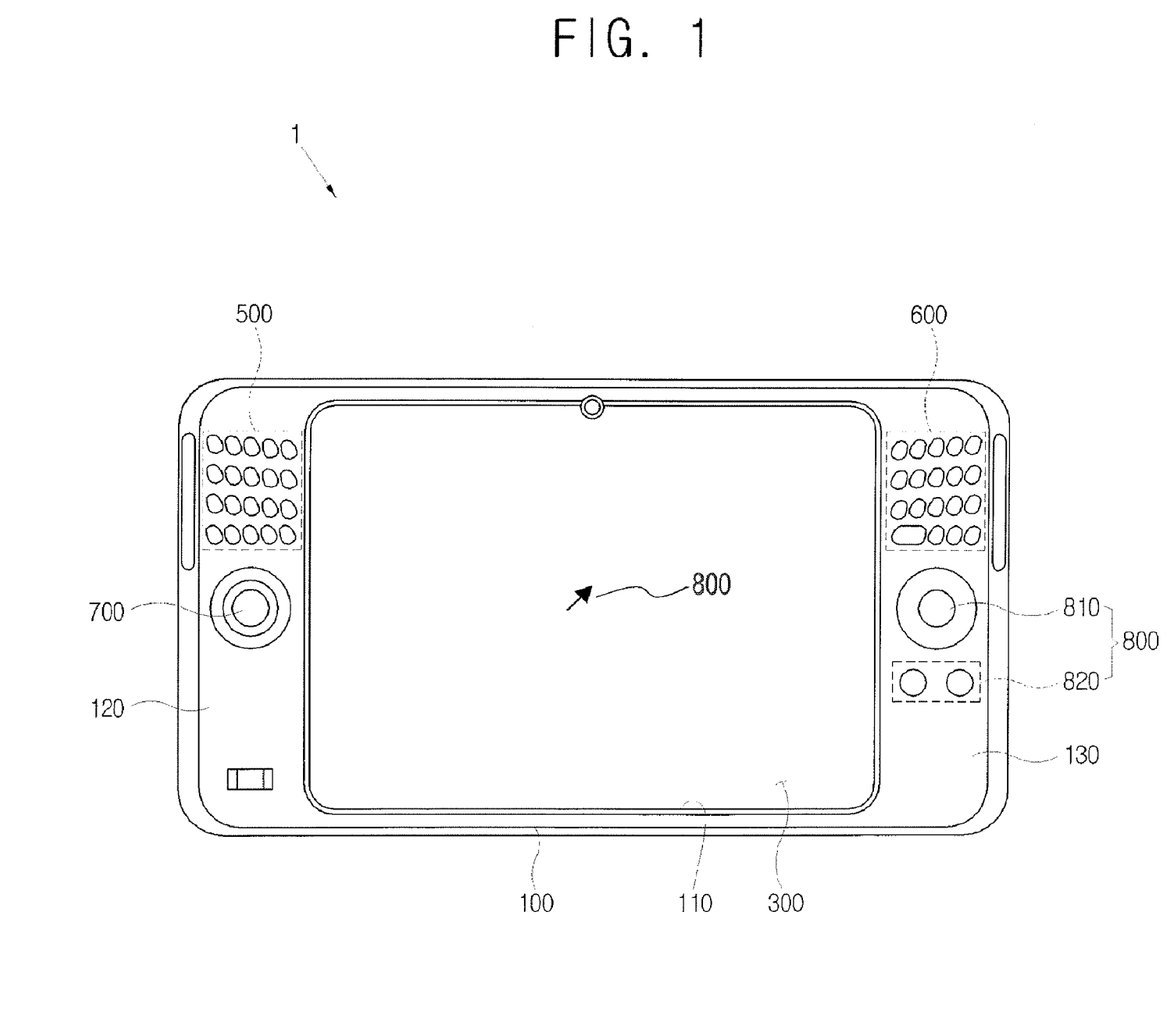
FIG. 1 illustrates a front view of a portable computer according to an embodiment of the present general inventive concept.
Figure 3:
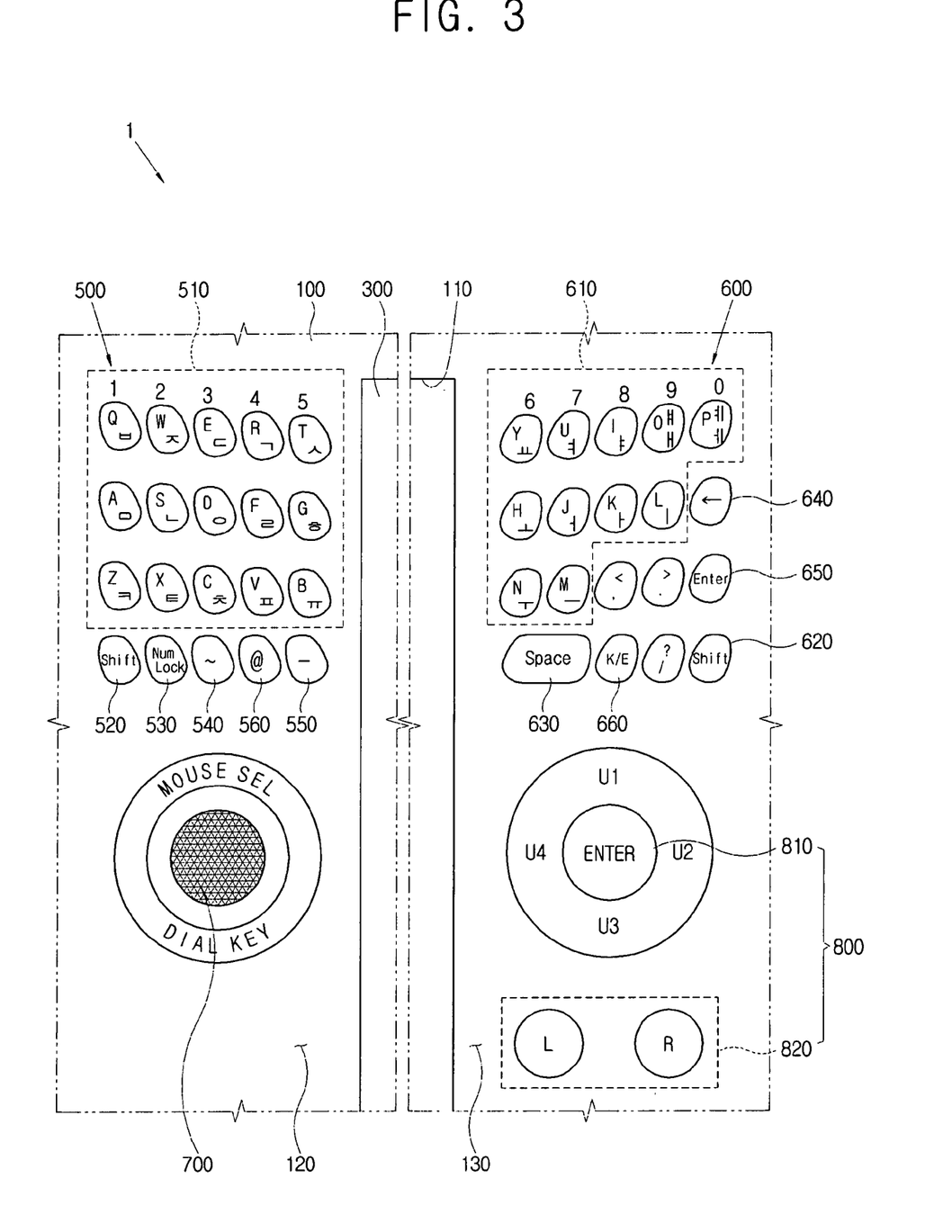
FIG. 3 illustrates a left input button group and a right input button group of the portable computer of FIG. 1.
Figure 4:
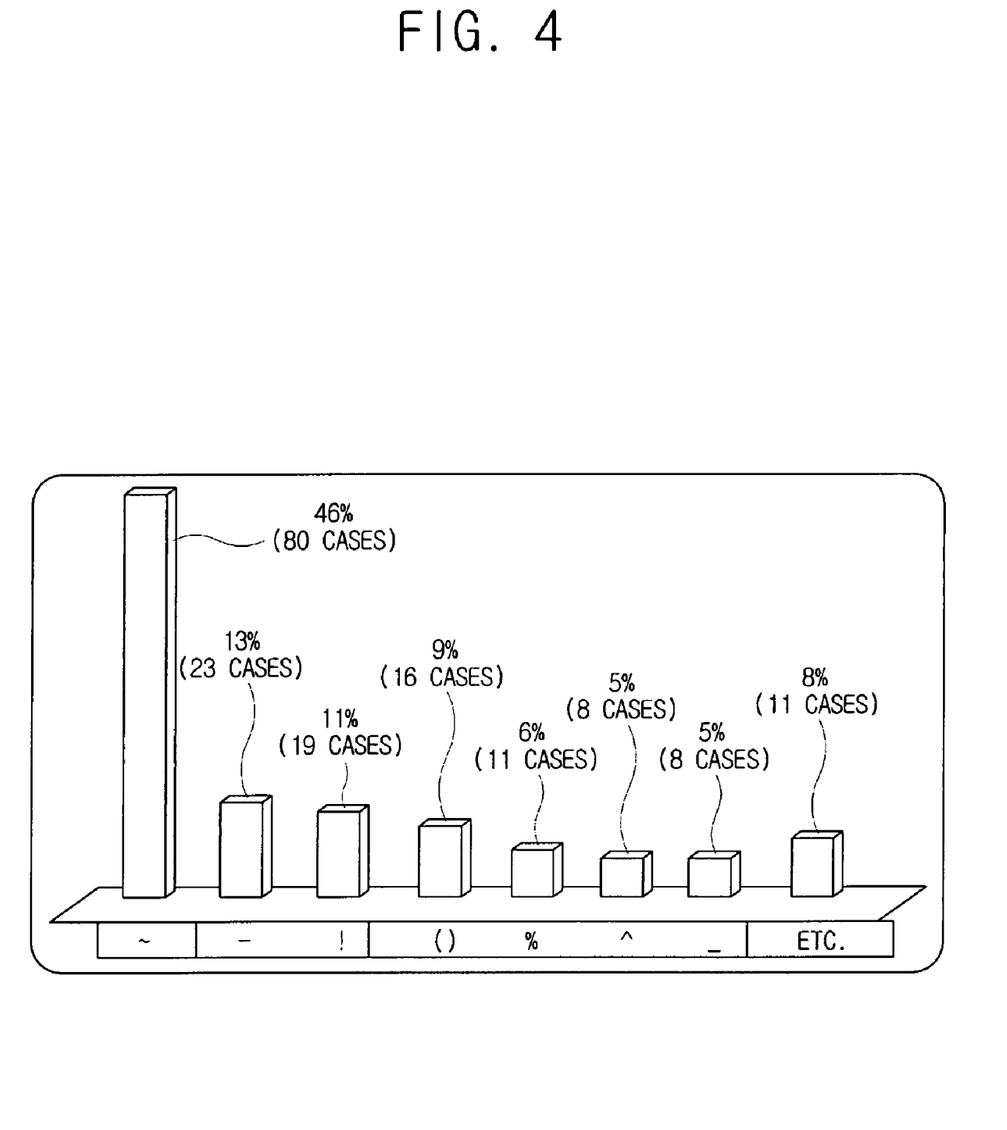
FIG. 4 illustrates a graph which represents a usage frequency of special characters in a character input keyboard of a computer interface.

Here, the left and right input button groups 500 and 600 are selected from a character input keyboard of a general computer interface, however the present general inventive concept is not limited thereto.

The main body casing 100 can have a rectangular shape which is elongated and has a predetermined thickness. Left and right sides of the portable computer 1 according to the present general inventive concept may be gripped by user's both hands. Thus, the length of the main body casing 100 can be provided in consideration of a length of a user's shoulder so that a user grips the portable computer 1 without difficulty.

The main body casing 100 accommodates and supports the display part 300, the main board 200 and the power supply 400. The main body casing 100 may include a shock absorbing material to stably support the display part 300, the main board 200, and the power supply 400 from an external shock. Otherwise, the main body casing 100 may also include a glossy material in consideration of an external appearance thereof.

The main body casing 100 accommodates and supports the display part 300 which faces a user, and accommodates and supports the main board 200 and the power supply 400 in a rear side of the display part 300. Auxiliary input and output parts (not illustrated), such as a camera, a speaker, and other input/output terminals, may be provided in an external surface of the main body casing 100.

The main body casing 100 includes an opening 110 which can be formed in a center of a front surface thereof facing a user, and a left panel 120 and a right panel 130 which are formed at left and right sides of the opening 110. The opening 110, the left and right panels 120 and 130 of the main body casing 100 are formed in the front surface thereof facing a user. Thus, a user can grip lower sides of the left and right panels 120 and 130.

The opening 110 can be formed in the center of the front surface of the main body casing 100 to expose the display part 300, accommodated in the main body casing 100, to the outside. A plate surface of the display part 300 displaying an image is directed to a user so that he/she views the image displayed thereon.

The left and right panels 120 and 130 can be provided in the left and right sides of the opening 110. The left input button group 500 and the right input button group 600 can be provided at upper parts of the left and right panels 120 and 130, and the pointer mover 700 and the auxiliary button 800 can be provided in center regions of the left and right panels 120 and 130 as illustrated in FIG. 1. Thus, a user may manipulate the foregoing elements with his/her thumb while gripping the lower sides of the left and right panels 120 and 130.

Figure 2:
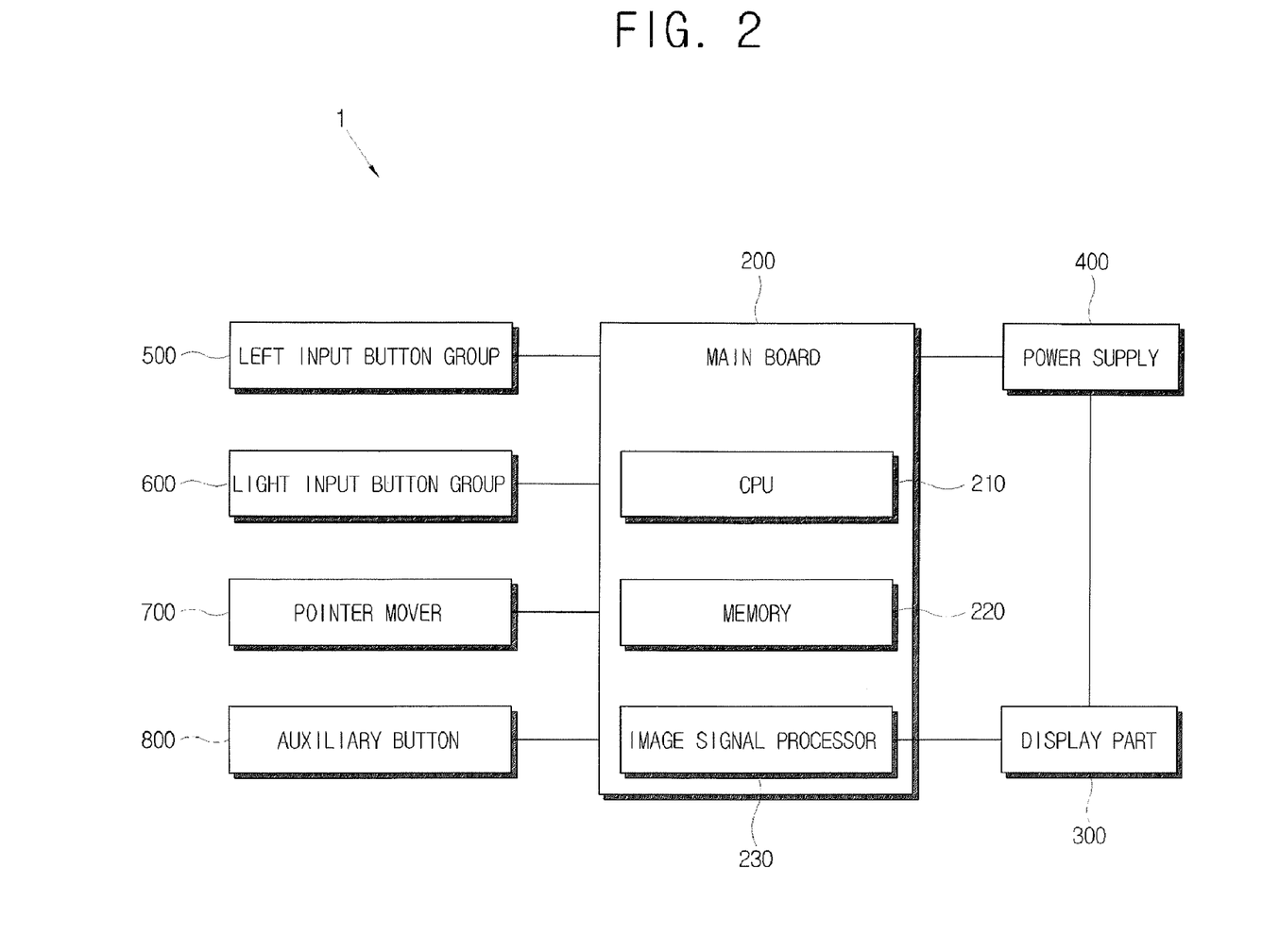
FIG. 2 illustrates a block diagram of the portable computer of FIG. 1.

The main board 200 may include a central processing unit (CPU) 210 and a memory 220. The main board 200 reads and processes inputted or stored digital data to output and provide the data to a user in various ways. The main board 200 further may include an image signal processor 230 which is electrically connected with the display part 300 to process data as an image signal to display an image on the display part 300.

The main board 200 and its sub elements may employ various known arts. For example, low power consumption and low heat generation technology may apply to the CPU 210, to thereby realize a mobility of the portable computer 1 and to enable a long usage with power supplied by the power supply 400. The image signal processor 230 may also include a graphic chip that can be provided in the main board 200. The main board 200 may employ various technologies to overcome external shock which the portable computer 1 may receive very often.

The memory 220 may include a main memory (not illustrated) having a random access memory (RAM), and an auxiliary memory (not illustrated) having a hard disk drive or a flash memory. The memory 220 can store software, such as an operating system (OS), in the auxiliary memory to drive the portable computer 1. The operating system may include various known OS, such as Windows XP, Windows VISTA, Mac OS, or Linux.

The display part 300 displays the image thereon corresponding to the image signal transmitted by the image signal processor 230. The plate surface of the display part 300 displaying the image is exposed to the outside through the opening 110, thereby enabling a user to view the image.

The display part 300 may include a liquid crystal display (LCD) to be small and light. In an exemplary embodiment of the present general inventive concept, the display part 300 may include a liquid crystal display which provides 800*400 resolution and 7-inch wide video graphic array (WVGA), but the present general inventive concept is not limited thereto.

The power supply 400 can supply power to the main board 200 and its sub elements, and the display part 300. The power supply 400 may include a charging battery (not illustrated) which is detachably attached to the main body casing 100. As the charging battery is charged by an external power source, a user may use the portable computer 1 regardless of location. The power supply 400 additionally may include a power volume sensor (not illustrated) to detect a volume of charged power. Thus, a user may know a remaining amount of power in the power supply 400 through the display part 300.

The left input button group 500 and the right input button group 600 can be selected from a character input keyboard of a known computer interface, and can be respectively arranged in upper parts of the left and right panels 120 and 130. A left general character button group 510 and a right general character button group 610 may include 26 alphabet buttons, and are respectively provided in the upper parts of the left and right panels 120 and 130. Other special character buttons and function buttons can be disposed below the 26 alphabet buttons.

The left and right general character button groups 510 and 610 can be provided to input at least one character other than the alphabet. In an exemplary embodiment of the present general inventive concept, a user may input Hangul, the Korean characters, as the other character, but the present general inventive concept is not limited thereto, and various other languages or other characters may be used. For example, languages can be selected depending on countries which use the portable computer 1 according to the present general inventive concept.

The left and right general character button groups 510 and 610 may include buttons to input the Korean characters by a Korea/English conversion button 660 (to be described later). As vowels and consonants combine into a syllable in the Korean characters, the left general character button group 510 can be provided to input Korean consonants while the right general character button group 610 can be provided to input Korean vowels. Thus, a user may input the Korean characters with both thumbs quickly and easily.

Here, the character input keyboard of the computer interface may be selected from one of various standard layouts. For example, QWERTY and DVORAK are widely used keyboard layouts to input characters of a computer interface, followed by AZERTY. QWERTY is the most popular keyboard layout which employs a typewriter keyboard layout. DVORAK is suggested as a replacement to QWERTY, which raises a typing pace by arranging most frequently used letters together to be typed more easily. AZERTY is adopted by some European countries.

The left input button group 500 can be provided in the left panel 120. The left input button group 500 may include the left general character button group 510 having a part of the alphabet buttons, a left shift button 520, a numeric lock button 530, a '~' button 540, a '-' button 550, and an "@" button 560.

A part of the 26 alphabets of the character input keyboard of a computer interface can be selected to be arranged in the left panel 120. The left general character button group 510 may include alphabet buttons provided in a left side of the character input keyboard of the computer interface so that a user can input characters without difficulty. The remaining alphabet buttons of the 26 alphabet can be provided in the right general character button group 610.

The left shift button 520 can be pressed by a user's left hand while the right general character button group 610 can be pressed by a user's right hand, thereby combining the two buttons to be used. For example, the left shift button 520 may be used to select uppercase and lowercase of the alphabet. Meanwhile, the left shift button 520 may also be provided to input double consonants and double vowels among the Korean characters.

The left shift button 520 can be provided below the left general character button group 510, and spaced farthest from the opening 110 and adjacent to a circumference of the main body casing 100. Thus, a user may be least interrupted by other buttons of the left input button group 500 when inputting characters.

The numeric lock button 530 can be adjacent to the left shift button 520. The numeric lock button 530 can be provided to input numerals with buttons included in the left and right general character button groups 510 and 610.

The '~' button 540 and the '-' button 550 are provided in a right side of the numeric lock button 530. The '~' button 540 and the '-' button 550 are used most frequently among the special characters of the character input keyboard of a computer interface. As illustrated in a graph representing the usage frequency of the special characters in FIG. 4, the '~' button 540 has 46% usage frequency, followed by the '-' button 550 having 13% usage frequency. Based on the result, the '~' button 540 and the '-' button 550 which are used most frequently can be included in the left input button group 500, thereby improving user's convenience. However, the present general inventive concept is not limited thereto, and other special characters may be includes as the buttons 530, 540, and 550.

The '@' button 560 can be selected among the special characters regardless of its usage frequency as it is necessary to type an e-mail address. Accordingly, as the '@' button 560 can be included in the left input button group 500, a user may send e-mail from the portable computer 1 without difficulty.

The right input button group 600 can be provided in the right panel 130 to be symmetrical to the left input button group 500, leaving the display part 300 therebetween. The right input button group 600 may include the right general character button group 610 which has the remaining alphabet buttons, a right shift button 620, a space button 630, a back space button 640, an enter button 650, and the Korean/English conversion button 660.

The right input button group 600 may further include '<', '>' and '?' buttons in consideration of usage frequency and necessity.

The right general character button group 610 may include the remaining alphabet buttons that are not included in the left general character button group 510.

The right shift button 620 can be pressed by a user's right hand while the left general character button group 510 can be pressed by a user's left hand, thereby combining the two buttons to be used. As the left shift button 520 and the right shift button 620 are respectively provided in the left input button group 500 and the right input button group 600, a user may input characters by selectively pressing the shift buttons 520 and 620 in the left and right general character button groups 510 and 610.

The right shift button 620 can be provided below the right general character button group 610, i.e., can be spaced farthest from the opening 110 and adjacent to the circumference of the main body casing 100. Thus, a user may be least interrupted by other buttons of the right input button group 600 when inputting characters.

The space button 630 can be provided below the right general character button group 610, to be adjacent to the opening 110. The space button 630 can be provided to input space between characters and is most frequently used in the character input keyboard of a computer interface. The space button 630 can be included in the right input button group 600 since 60% of users press the space button 630 with their right hand. The space button 630 can be larger than other buttons to allow a user may press the space button 630 without difficulty.

The back space button 640 can serve to remove a character which is before a pointer or a cursor 800.

The enter button 650 can be provided to select an object of the display part 300 or to change paragraphs or lines to input characters. The enter button 650 can be provided below the right general character button group 610, and can be spaced farthest from the opening 110 and adjacent to the circumference of the main body casing 100. Thus, a user may be least interrupted by other buttons of the right input button group 600 when inputting characters.

Like the right shift button 620, the enter button 650 can be provided below the right general character button group 610, and can be spaced farthest from the opening 110 and adjacent to the main body casing 100.

The Korean/English conversion button 660 can be provided to convert the alphabet or Hangul, the Korean characters. The Korean/English conversion button 660 can be pressed by a user to input one of the alphabet or the Korean characters from the left and right general character button group 510 and 610. The left and right general character button groups 510 and 610 have the alphabet and the Korean characters written thereon.

However, the present general inventive concept is not limited thereto, and if the portable computer 1 includes other characters instead of Hangul, the Korean/English conversion button 660 can be provided to input one of the alphabet or the other characters. If the left and right general character button groups 510 and 610 are provided to input only the alphabet, other function buttons, such as an Alt button, may replace the Korean/English conversion button 660.

The pointer mover 700 can be provided at a first side of the left panel 120 to be spaced from the left input button group 500. The pointer mover 700 can be provided below the left input button group 500. The pointer mover 700 moves the pointer 800 displayed on the display part 300 in a predetermined direction.

The auxiliary button 800 can be provided below the right input button group 600. The auxiliary button 800 can be provided to be symmetrical to the pointer mover 700, leaving the display part 300 therebetween. Thus, a user's right hand can press the auxiliary button 800 while his/her left hand manipulates the pointer mover 700. User's both hands are positioned to be symmetrical, thereby stably supporting the main body casing 100. The auxiliary button 800 may include an auxiliary enter button 810 and a mouse clicking button 820.

The auxiliary enter button 810 may have the same function as the enter button 650. While the enter button 650 included in the right input button group 600 can be mainly used to input characters, the auxiliary enter button 810 can be used to select a predetermined object displayed on the display part 300 by moving the pointer 800 by the pointer mover 700.

The mouse clicking button 820 can be provided below the auxiliary enter button 810. The mouse clicking button 820 may include functions of left and right buttons of a conventional computer mouse. The mouse clicking button 820 can be used to select the pointer 800 and pop-up information.

A process of writing a document by the portable computer 1 according to the present general inventive concept will be described with reference to FIGS. 1 to 3.

A user faces the display part 300, and grips the lower parts of the left and right panels 120 and 130 with both hands. If the portable computer 1 is turned on, the power supply 400 supplies power to the main board 200 and the display part 300. The CPU 210 drives the operating system stored in the memory 220, and displays an image on the display part 300 through the image signal processor 230.

If the operating system based, on a graphic user interface (GUI), is initially driven, the user confirms it through the display part 300. The user moves the pointer 800 by manipulating the pointer mover 700 with his/her left hand, and places the pointer 800 on an execution file icon of an application to write documents. The user presses the auxiliary enter button 810 with his/her right hand to execute the application to write the documents.

If the application is executed, the user places the pointer 800 in a document-writing region of the application. Then, the user presses the left input button group 500 with his/her left thumb, and the right input button group 600 with his/her right thumb to input characters.

If a user wants to input Hangul, the Korean characters, the user presses the Korean/English conversion button 660 with his/her right hand. Then, the user may input Hangul with the left and right general character button groups 510 and 610. If the user wants to input the alphabet, the user presses the Korean/English conversion button 660 again.

A method of using the left shift button 520 will now be described. For example, if a user wants to input "예", which means yes in Korean, since both '에' and '예' Korean vowels, are written in a single button of the right general character button group 610, if a user presses the single button only, '에', is inputted. To input '예' a user presses the single button while pressing the left shift button 520 or the right shift button 620.

Accordingly, to type "예", first, the user presses 'ㅇ' a Korean consonant, and, as 'ㅔ/ㅖ' button is included in the right input button group 600, a user may have difficulty in pressing the button while pressing the right shift button 620. Then, a user may press the 'ㅖ' button with his/her right hand while pressing the left shift button 520 with his/her left hand, thereby inputting "예" in the application.

According to the foregoing principle, a user may press the right shift button 620 to input characters of buttons included in the left input button group 500.

The special character buttons and function buttons that may be included in the left and right input button groups 500 and 600 are provided below the left and right general character button groups 510 and 610 to be adjacent to user's both hands, thereby enabling a user to access the buttons without difficulty.

Since the space button 630 is used most frequently it can be larger than other buttons to be easily pressed by a user.

As the left and right input button groups 500 and 600 are respectively provided in the left and right panels 120 and 130 of the display part 300, a user may input characters without difficulty.

The character input keyboard of the computer interface from which the left and right input button groups 500 and 600 are selected may include not only general characters such as the alphabet, but also special characters and the function buttons selected in consideration of a frequency of usage. The buttons can be arranged in consideration of a user's usage environment so that a user inputs characters more easily.

As the pointer mover 700 and the auxiliary button 800 are provided, a user may move the pointer 800 to the predetermined object displayed on the display part 300 to select the object and perform the pop-up function. That is, the pointer mover 700 and the auxiliary button 800 support an input function of the left and right input button groups 500 and 600.

As described above, buttons of a conventional key board used in a computer cannot be divided into at least two groups separated and/or disposed opposite to each other with respect to a display part. The two separate groups of the buttons may be disposed on two separate boards other than the main board or may be connected to two different portions of the main board. A combination of at least one button of one of the two button groups and at least one button of the other one of the two button groups can constitute a word or character to be displayed on the display part.

As described above, the present general inventive concept provides a portable computer in which a user inputs characters without difficulty, and which improves user's convenience.

The present general inventive concept also provides a portable computer which arranges character buttons in consideration of a user's character input habit and improves user's accessibility.

The present general inventive concept also provides a portable computer which prevents an image displayed on a display part from being interrupted when inputting characters to enable a user to check the image without difficulty.

Further, the present general inventive concept also provides a portable computer which prevents a display part from being damaged when a user inputs characters, extends a lifespan thereof, improves versatility, and satisfies user's demands.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A portable computer, comprising:
a main body casing having an opening formed in a center part thereof, and a first panel and a second panel which are provided at opposite sides of the opening;
a display part which displays an image through the opening; and
a first input button group and a second input button group which are selected from a character input keyboard of a computer interface, and are respectively provided in the first panel and the second panel;
a pointer mover which is provided in the first panel spaced from the first input button group to move a pointer displayed on the display part; and
an auxiliary enter button which is provided in the second panel spaced from the second input button group to click the pointer.

2. The portable computer of claim 1, wherein the character input keyboard of the computer interface comprises one of a QWERTY layout, a DVORAK layout, and an AZERTY layout.

3. The portable computer of claim 1, wherein the first input button group comprises at least one of a '~' button, a '-' button, and an '@' button.

4. The portable computer of claim 3, wherein the first input button group further comprises a numeric lock button.

5. The portable computer of claim 3, wherein the second input button group comprises at least one of a shift button, a back space button, a space button, and an enter button.

6. The portable computer of claim 5, wherein the character input keyboard of the computer interface allows the alphabet and other characters to be inputted there through, and the second input button group further comprises an input conversion button to convert between the alphabet and the other characters.

7. The portable computer of claim 6, wherein the other characters comprise Korean characters.

8. The portable computer of claim 7, wherein the first input button group allows Korean consonants to be inputted and the second input button group allows Korean vowels to be inputted.

9. The portable computer of claim 5, wherein the shift button is spaced farthest from the opening, and is adjacent to a circumference of the main body casing.

10. The portable computer of claim 5, wherein the shift button is respectively provided in the first input button group and the second input button group.

11. The portable computer of claim 5, wherein the enter button is provided in the second input button group to be spaced farthest from the opening and adjacent to the circumference of the main body casing.

12. The portable computer of claim 5, wherein the space button is larger than other buttons included in the character input keyboard of the computer interface.

13. A portable computer, comprising:
a main body defining an opening and having first and second panels disposed surrounding the opening;
a display part disposed within the main body to display an image through the opening;
first and second input button groups respectively disposed at the first and second panels to separately interface with a main board of the portable computer to control the display part;
a pointer mover which is provided in the first panel spaced from the first input button group to move a pointer displayed on the display part; and
an auxiliary enter button which is provided in the second panel spaced from the second input button group to click the pointer.

14. The portable computer of claim 13, further comprising:
an auxiliary button group disposed at another one of the first and second panels to control a function of the pointer.

15. The portable computer of claim 13, wherein the first and second input button groups comprise input keys disposed among the first and second input button groups corresponding to one of a QWERTY keyboard layout, a DVORAK keyboard layout, and an AZERTY keyboard layout.

16. The portable computer of claim 13, wherein the first and second panels are disposed opposite to each other with respect to the opening.

17. The portable computer of claim 13, wherein the main body comprises a main board to control the display part, and the first and second panels are connected to different sections of the main body.

18. The portable computer of claim 13, wherein the first input button group comprises first buttons, the second input groups comprises second buttons, and a combination of the first buttons and the second buttons generates at least one word as the image on the display part.

19. The portable computer of claim 14, wherein the individual keys comprising the first and second input button groups to interface with the main board are selected according to at least one of a frequency of use, a location of use of the personal computer, and a required functionality of the personal computer.

20. The portable computer of claim 14, wherein each button of the first and second input button groups comprises more than one input key, and the portable computer further comprises a special function button to select among the more than one input key corresponding to each button of the first and second input button groups.

21. The portable computer of claim 14, further comprising:
an input conversion button to convert a language associated with the inputs keys.

22. The portable computer of claim 21, wherein the input conversion button converts the language of the inputs keys from western-alphabet characters to Korean characters.

23. The portable computer of claim 22, wherein the first input button group allows Korean consonants to be inputted and the second input button group allows Korean vowels to be inputted.

24. The portable computer of claim 19, wherein the input keys comprise at least one of a '~' button, a '-' button, an '@' button, a shift button, a back space button, a space button, and an enter button.

25. A portable computer, comprising:
a main body having an opening;
a display part to display an image through the opening; and
first and second button groups separately disposed within the main body, each button group having a portion of a standard keyboard to control the image;
a pointer mover which is provided in a first panel of the body that is spaced from the first input button group to move a pointer displayed on the display part; and
an auxiliary enter button which is provided in a second panel of the body that is spaced from the second, input button group to click the pointer.

* * * * *